(12) United States Patent
Kochar et al.

(10) Patent No.: US 9,851,996 B2
(45) Date of Patent: Dec. 26, 2017

(54) APPLYING FIRMWARE UPDATES IN A SYSTEM WITH ZERO DOWNTIME BY SELECTIVELY OFFLINING AND ONLINING HARDWARE USING A SCALE-UP HYPERVISOR LAYER

(71) Applicant: Lenovo Enterprise Solutions (Singapore) Pte. Ltd., Singapore (SG)

(72) Inventors: Sumeet Kochar, Cary, NC (US); Randolph S. Kolvick, Durham, NC (US); John M. Borkenhagen, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 78 days.

(21) Appl. No.: 14/667,259

(22) Filed: Mar. 24, 2015

(65) Prior Publication Data
US 2016/0283221 A1    Sep. 29, 2016

(51) Int. Cl.
G06F 9/44      (2006.01)
G06F 9/445     (2006.01)
G06F 9/455     (2006.01)

(52) U.S. Cl.
CPC ......... *G06F 9/45558* (2013.01); *G06F 8/665* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,544,004 B2 | 9/2013 | Fultheim et al. | |
| 8,832,692 B2 | 9/2014 | Fultheim et al. | |
| 2007/0028244 A1* | 2/2007 | Landis ................ | G06F 9/5016 718/108 |
| 2007/0061441 A1* | 3/2007 | Landis ................ | G06F 9/5077 709/224 |

\* cited by examiner

*Primary Examiner* — Chuck Kendall
(74) *Attorney, Agent, or Firm* — Jeffrey L. Streets (57) ABSTRACT

A method includes running a scale-up hypervisor on a server complex including at least one server and running a single operating system and at least one application on top of the scale-up hypervisor. The method further includes identifying a firmware update available for a first hardware component within the server complex. The scale-up hypervisor removes all workload from the first hardware component, and the identified firmware update is applied to the first hardware component while the first hardware component is idle and the hypervisor continues running the single operating system and the at least one application. Preferably, the method may be used to sequentially apply firmware updates to various hardware components across the plurality of servers without ever shutting down the entire plurality of servers.

20 Claims, 10 Drawing Sheets

Timing and Scope of Update

APPLYING FIRMWARE UPDATES IN A SYSTEM WITH ZERO DOWNTIME BY SELECTIVELY OFFLINING AND ONLINING HARDWARE USING A SCALE-UP HYPERVISOR LAYER

BACKGROUND

Field of the Invention

The present invention relates to methods and systems for updating firmware in the hardware components of a server.

Background of the Related Art

A data center is a facility where computer equipment and related infrastructure are consolidated for centralized operation and management. Computer equipment may be interconnected in a datacenter to produce large, powerful computer systems that are capable of storing and processing large amounts of data for entities such as large corporations, web hosting services, and Internet search engines. A data center may house any number of racks, each capable of holding a large number of servers and supporting equipment, such as switches, power supplies, network communications interfaces, environmental controls, and security devices. Servers and supporting equipment are typically housed in rack-mounted, multi-server enclosures (e.g. a multi-blade chassis) and arranged in a high-density configuration. As many servers and rack-mounted enclosures as needed may be interconnected to produce a system having the desired performance.

Individuals and businesses want their computer applications to experience zero downtime to avoid impacts to their busy schedules, business objectives and customer demands. This applies pressure to keep service windows small, such that needed maintenance and updates are often delayed as much as possible. For example, a server or cluster of servers may continue running with a firmware version that has long been out of date. A major reason for not updating firmware is that the task of updating firmware typically takes a significant period of time to complete and then may require a server restart. Unfortunately, continuing to run the old firmware means that system reliability declines over time as critical fixes don't get applied. This type of decline in reliability is an even a particular concern for complex scaled systems where critical fixes are frequently released. Taking a complex scaled system offline for firmware updates can result in a complete interruption of service, since it is cost prohibitive to install a redundant scaled system for this purpose.

BRIEF SUMMARY

One embodiment of the present invention provides a method comprising running a scale-up hypervisor on a server complex including at least one server and running a single operating system and at least one application on top of the scale-up hypervisor. The method further comprises identifying a firmware update available for a first hardware component within the server complex. The scale-up hypervisor removes all workload from the first hardware component, and the identified firmware update is applied to the first hardware component while the first hardware component is idle and the hypervisor continues running the single operating system and the at least one application.

Another embodiment of the present invention provides a computer program product for applying firmware updates, wherein the computer program product comprises a computer readable storage medium having program instructions embodied therewith, and wherein the program instructions are executable by a processor to cause the processor to perform a method. The method comprises running a scale-up hypervisor on a server complex including at least one server and running a single operating system and at least one application on top of the scale-up hypervisor. The method further comprises identifying a firmware update available for a first hardware component within the server complex. The scale-up hypervisor removes all workload from the first hardware component, and the identified firmware update is applied to the first hardware component while the first hardware component is idle and the hypervisor continues running the single operating system and the at least one application.

DETAILED DESCRIPTION

One embodiment of the present invention provides a method comprising running a scale-up hypervisor on a server complex including at least one server and running a single operating system and at least one application on top of the scale-up hypervisor. The method further comprises identifying a firmware update available for a first hardware component within the server complex. The scale-up hypervisor removes all workload from the first hardware component, and the identified firmware update is applied to the first hardware component while the first hardware component is idle and the hypervisor continues running the single operating system and the at least one application.

A scale-up hypervisor can run on a server complex including a single server or on a server complex including a plurality of servers that create a large symmetric multi-processor (SMP) that looks like a single server to the operating system (OS). This is sometimes referred to as SMP scaling. Embodiments of the present invention utilize the scale-up hypervisor in a method of applying firmware updates to any hardware component in the server complex. As disclosed herein, the scale-up hypervisor may remove workload from any one hardware component or server to facilitate updating or repairing of the relevant firmware while continuing to run the operating system and an application on the server complex. In other words, the identified firmware update may be applied to the first hardware component without the application experiencing any downtime. A beneficial aspect of various embodiments of the invention is that firmware updates may be sequentially applied to hardware components across the server complex.

Optionally, the method may further comprise the scale-up hypervisor assigning workload to the first hardware component after the identified firmware update to the first hardware component has been completed. As a result the capacity of the first hardware component is only unavailable for a short period of time while the firmware of the first hardware component is being updated. In a further option, the method may further comprise identifying a firmware update that is available for a second hardware component within the server complex, the scale-up hypervisor removing workload from the second hardware component to one or more other hardware component within the server complex, and applying the identified firmware update to the second hardware component while the hypervisor continues running the operating system and the application on the server complex. Similarly, methods of the present invention may sequentially remove workload from any one or more hardware component and update the firmware on the one or more hardware component before updating the firmware of any further hardware component. It should be recognized that if the server complex includes a plurality of servers and workload is removed from an entire server, then a firmware update may be simultaneously applied to any or all of the hardware components on that server.

In another embodiment, the method may further comprise the scale-up hypervisor removing all workload from a first server within the server complex, then taking the first server offline after all of the workload has been removed from the first server. After the identified firmware update has been completed, the method may bring the first server back online and assign workload to the first server. Optionally, the identified firmware update may be applied to a processor on the first server. Still further, when a server has been taken offline, it may be desirable to apply firmware updates to any of the hardware components on that server for which a firmware update is available. With the server offline, power is still available to the platform management module (i.e., baseboard management controller (BMC) or integrated management module (IMM)) and it is possible to apply any firmware update that can be handled through the platform management module. For example, the administrator may communicate instructions and firmware updates to the platform management module over a network.

The method may further comprise the scale-up hypervisor passing system resource usage data for each server or hardware component to a platform management module on each server. Such data may be passed at regular intervals, in response to a request from the platform management module, or in response to the resource usage reaching a predetermined setpoint. Optionally, the method may initiate the firmware update in response to system resource usage for all servers being less than a predetermined amount of system resource usage. Still further, system resource usage may be modeled as a function of time of day, day of the week, or day of the year, such that an appropriate time for applying a firmware update may be predicted or planned. Such modeling may be prepared by an administrator module using system resource usage data received from the scale-up hypervisor via the operating system or the platform management module. One preferred method includes requesting the platform management module to report current system resource usage at a time that the modeling expects system resource usage that is less than a predetermined amount of system resource usage, and initiating the firmware update if the platform management module indicates that the current system resource usage is less than the predetermined amount of system resource usage. In a specific option, the platform management module may request the scale-up hypervisor to provide system resource usage for one or more hardware components identified by the administrator module as having a firmware update available.

Embodiments of the invention may include the operating system applying a firmware update to a first hardware component of the first server. Furthermore, the platform management module may apply a firmware update to a second hardware component of the first server. Any individual firmware update may be applied either by the operating system or the platform management module, depending upon the configuration of the server. Furthermore, a firmware update package including firmware updates for multiple hardware components of a server may be applied by the operating system, the platform management module, or both the operating system and the platform management module. It should be recognized that some hardware components of a server may only be able to receive a firmware update by the operating system and other hardware components of a server may only be able to receive a firmware update by the platform management module. In addition, certain hardware components, such as the processor, may only receive a firmware update while the server is offline.

The administrator may compare the firmware version of firmware installed on a hardware component with the firmware version of a firmware update available for the hardware component to determine whether to update the firmware of the hardware component. Information regarding currently installed firmware versions of various hardware components may be reported to the administrator from the platform management module, which stores this information as vital product data. A firmware update package provided to the administrator will include updated firmware versions for one or more hardware component types, models or versions. Therefore, the administrator can determine whether any of the available firmware updates should be applied to any of the hardware components of a given one of the servers.

The scale-up hypervisor is responsible for moving workload to facilitate a firmware update to a hardware component. Preferably, a firmware update is delayed or scheduled for a time period when system resource usage is low enough that taking one or more hardware component offline will not result in a noticeable reduction in workload performance. After determining that a firmware update should be applied to a particular hardware component, the scale-up hypervisor may prevent use of a first hardware component of a first server while a firmware update is applied to the first hardware component. While the scale-up hypervisor may remove all workload from a server and take the server offline, it is also possible for the scale-up hypervisor to prevent use of one or more hardware components without migrating all workload away from the first server and without taking the first server offline. Specifically, the scale-up hypervisor may move workload among hardware components of the same type within a given server, such as moving workload away from one processor in a multiple-processor server. It should be recognized that moving workload locally within a server may be preferable to moving workload from one server to another (remote) server within the complex due to reduced latency to complete the workload and avoiding the use of network bandwidth.

Another embodiment of the present invention provides a computer program product for applying firmware updates, wherein the computer program product comprises a computer readable storage medium having program instructions embodied therewith, and wherein the program instructions are executable by a processor to cause the processor to perform a method. The method comprises running a scale-up hypervisor on a server complex including at least one server and running a single operating system and at least one application on top of the scale-up hypervisor. The method further comprises identifying a firmware update available for a first hardware component within the server complex. The scale-up hypervisor removes all workload from the first hardware component, and the identified firmware update is applied to the first hardware component while the first hardware component is idle and the hypervisor continues running the single operating system and the at least one application.

The foregoing computer program products may further include computer readable program code for implementing or initiating any one or more aspects of the methods described herein. Accordingly, a separate description of the methods will not be duplicated in the context of a computer program product.

Figure 1:
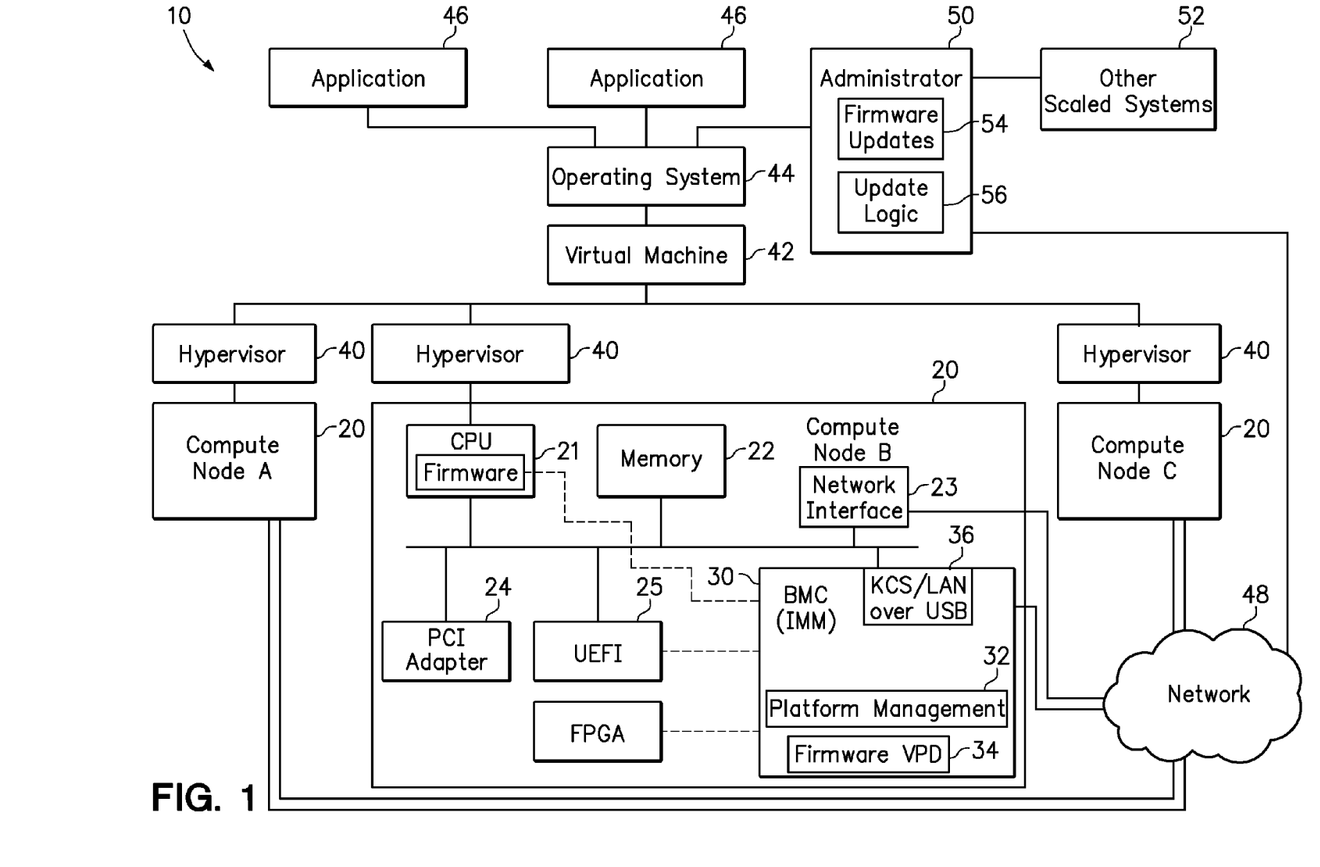
FIG. 1 is a diagram of computer cluster using a scale-up hypervisor suitable for updating firmware to various compute nodes and components of the cluster.

FIG. 1 is a diagram of a system 10 including a server complex running a scale-up hypervisor or hypervisor layer 40 suitable for updating firmware to hardware components across a plurality of compute nodes or servers 20. The hypervisor layer 40 spans across the plurality of servers 20 in a scaled complex, such as a symmetric multi-processor system, and virtualizes the physical hardware components of the servers 20 in the form of a virtual machine 42. However, the hypervisor may be run on even a single one of the servers 20. The virtual machine 42 hosts an operating system 44 that enables applications 46 to be installed and run on top of the operating system. The hypervisor layer 40 makes the plurality of servers 20 appear to the operating system 44 as a single server. It is the hypervisor layer 40 that manages how workload from an application 46 is assigned to various servers or hardware components within the servers. Accordingly, the hypervisor layer may move workload off a selected hardware component when desired to facilitate a firmware update.

In the system 10, the individual servers 20 are connected for communication over a network 48, which is preferably a private network such as an Ethernet network. The network enables the servers to coordinate tasks, such as maintaining mirrored memory among the servers. The same network 48 or a separate network may be used for out-of-band (OOB) communications between an administrator module (or simply "administrator") 50 and a platform management module, shown here as a baseboard management module (BMC) or integrated management module (IMM) 30, of each server 20. For example, the OOB communication through the network may be used by the administrator 50 to receive system resource usage data from the BMC 30 and push firmware updates down to the BMC 30. The administrator 50 may also communicate in-band (IB) with the operating system 44 to provide firmware updates. Still further, the administrator may be in similar OOB and/or IB communication with other scaled systems 52, such that the administrator may coordinate firmware updates for multiple scaled systems. Without limitation, the administrator 50 is shown to include firmware updates 54 and update logic 56.

The compute node or server 20 includes a processor or central processing unit (CPU) 21, memory 22, network interface 23, PCI adapter 24, and a unified extensible firmware interface (UEFI) 25, each connected to a system bus. The platform management module, shown as a baseboard management controller (BMC) or integrated management module (IMM) 30, includes a service processor that serves various functions including monitoring system performance. For the purposes of embodiments of the present invention, the BMC 30 performs platform management logic 32 and has access to firmware vital product data (VPD) 34 for the hardware components of the server 20. The BMC 30 also includes an interface, such as a keyboard controller style (KCS) interface or the faster "LAN over USB" interface 36, to the CPU 21. KCS and LAN over USB are in-band interfaces that allow communication between the BMC 30 and the CPU 21, such as for the hypervisor and operating system tools to push down updates to the BMC or for the BMC to apply firmware updates to the CPU. It should be recognized that any specific server configuration may include other or additional communication channels. For example, some chip sets may include a pin dedicated for communication with the BMC or other platform management module.

Using a LAN over USB interface enables in-band communications to the BMC/IMM without requiring the BMC/IMM to have IPMI device drivers or USB daemons. Instead, the BMC/IMM hardware on the system board presents an internal Ethernet NIC from the BMC/IMM to the operating system. LAN over USB is also called the "USB in-band interface" in the IMM Web interface. Typically, an IMM IP address for the LAN over USB interface is set to a static address of 169.254.95.118 with a subnet mask of 255.255.0.0. In the event of an IP address collision on the network, the IMM might obtain a different IP address in the 169.254.xxx.xxx range. Because the IMM might obtain a different IP address for the LAN over USB interface, the Lenovo Advanced Settings Utility (ASU) and firmware flash utilities, DSA, and the IBM Director Agent use the Service Location Protocol (SLP) to discover the IMM IP address. These tools perform an SLP multicast discovery on the LAN over USB interface. When they receive a response from the IMM, they obtain the attributes that contain the IP address the IMM is using for the LAN over USB interface.

Figure 2:
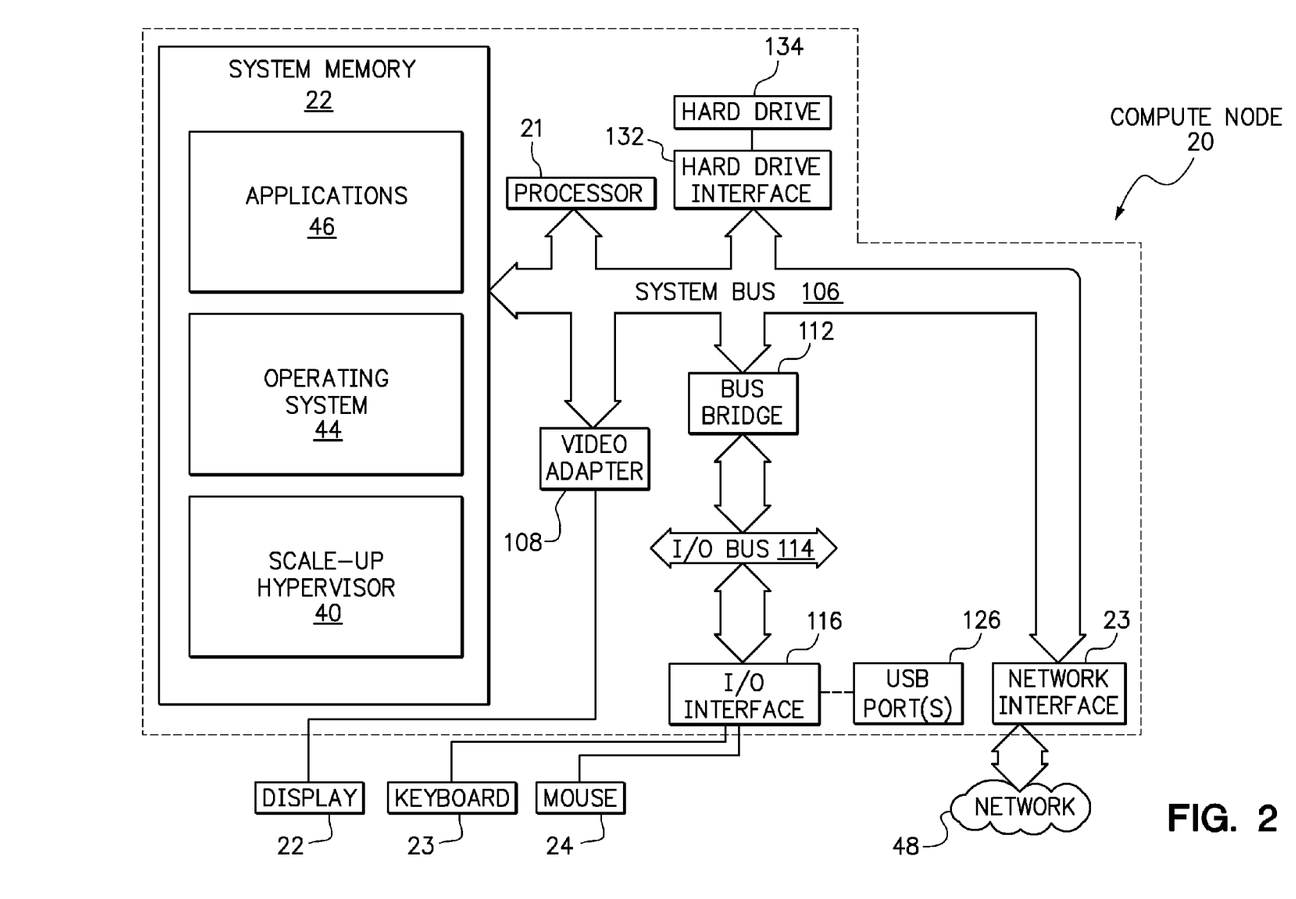
FIG. 2 is a diagram of a compute node that may be used in accordance with various embodiments of the present invention.

FIG. 2 is a diagram of a compute node or server that may be used in accordance with various embodiments of the present invention. The compute node 20 includes a processor unit 21 that is coupled to a system bus 106. Processor unit 21 may utilize one or more processors, each of which has one or more processor cores. An optional video adapter 108, which drives/supports a display 22, may also be coupled to the system bus 106. The system bus 106 is coupled via a bus bridge 112 to an input/output (I/O) bus 114 coupled to an I/O interface 116. The I/O interface 116 affords communication with various I/O devices, such as including a keyboard 23 and a mouse 24. The I/O devices may optionally include storage devices, such as CD-ROM drives and multi-media interfaces, other printers, and external USB port(s). While the format of the ports connected to I/O interface 116 may be any known to those skilled in the art of computer architecture, in a preferred embodiment some or all of these ports are universal serial bus (USB) ports 126. As depicted, the compute node 20 is able to communicate over a network 48 using a network interface 23. The network 48 is preferably a private network such as an Ethernet LAN.

A hard drive interface 132 is also coupled to system bus 106 and interfaces with a hard drive 134. In a preferred embodiment, the hard drive 134 populates a system memory 22, which is also coupled to system bus 106. The system memory is defined as a lowest level of volatile memory in computer 100. This volatile memory may include additional higher levels of volatile memory (not shown), including, but not limited to, cache memory, registers and buffers. The data that populates the system memory 136 may include the hypervisor 40, the operating system (OS) 44 and the application programs 46. The hardware elements depicted in computer 20 are not intended to be exhaustive, but rather are representative components suitable to perform the processes of a compute node or server.

FIGS. 3-6 are diagrams illustrating only certain entities and connections of the system 10 of FIG. 1 along with steps in a process. The steps in each of the FIGS. 3-6 are not exclusive methods, but have been separated into separate Figures to simplify the discussion and to emphasize potential variations in the methods of the present invention. Furthermore, reference numbers to the entities have been omitted so as not to detract from the illustration of the steps. It should be understood that the methods may also be performed in relation to any one or more servers in a server complex.

The general strategy implemented in these processes is to avoid consuming host CPU resources that are needed by existing workloads. Since the BMC has its own processor running independent of the host CPU and the administrator may communicate out-of-band over the network with the BMC, the administrator can collect data from the BMC and provide firmware updates to the BMC without having any impact on workloads. When BMC indicates that system resource usage is sufficiently low, then the firmware update may proceed in two different ways or a combinations of the two ways. In a first option, the administrator may push the firmware update over the network to the BMC, which can apply firmware updates to certain hardware components such as a UEFI, FPGA, or the BMC itself. In a second option, the administrator can push down update tools to the operating system running in-band, where the tools are run in order to perform the firmware updates. When tools are run in-band in the guest operating system, the operating system may still forward certain firmware updates over in-band channel, such as a LAN Over USB, to the BMC for applying to the relevant hardware component(s).

Figure 3:
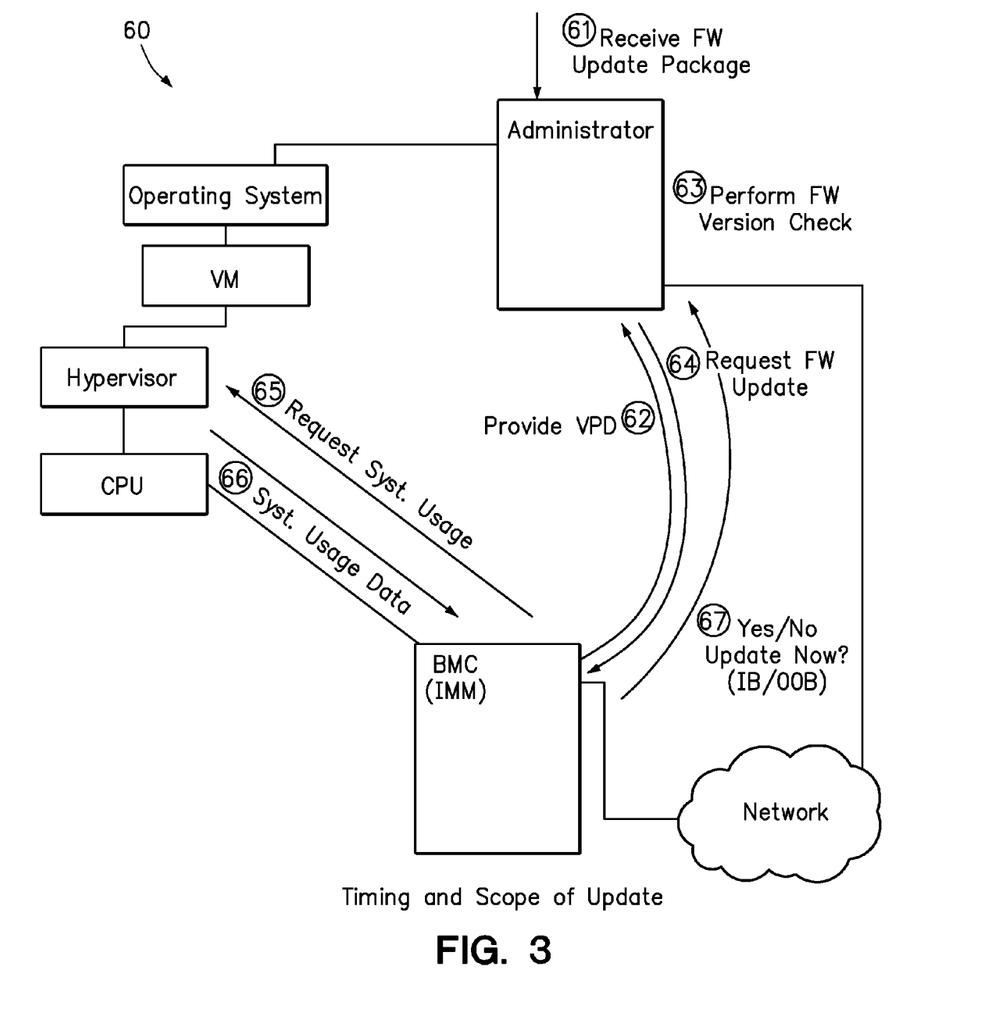
FIG. 3 is a schematic diagram of a process of determining the timing and scope of a firmware update.

FIG. 3 is a schematic diagram of a process 60 of determining the timing and scope of a firmware update for one or more hardware component on a particular server. It should be appreciated that the administrator may interact with other servers in the system (see FIG. 1) to perform the same or similar process. In step 61, the administrator receives a firmware update package. This may be obtained, for example, in the form of an update disk or a download from a manufacturer's website. A typical update package includes an extensible markup language (XML) definition file along with the actual firmware updates. The XML may be parsed out of the update package to facilitate version checking between what firmware version is current installed in the system what firmware version is being requested to be flashed via the firmware update package, and verify that the firmware update is being applied to a proper system or hardware component.

In step 62, the BMC or other platform management module provides vital product data (VPD) to the administrator enumerating the firmware versions currently installed on hardware components of the relevant compute node or server. In step 63, the administrator performs a firmware version check by comparing the firmware update package with the vital product data. Accordingly, the administrator can identify those hardware components of the server that have a firmware update available. Where applicable, the administrator may also apply various eligibility rules to verify that the available update is compatible with the hardware component or compatible with the previous firmware version. In some instances, it can be necessary to apply one or more intermediate firmware version in order to avoid incompatibility issues.

In step 64, the administrator sends the BMC a request for a firmware update to the relevant hardware component(s). In step 65, the BMC sends a requests for system resource usage data to the hypervisor, perhaps specifying the hardware components for which a firmware update is available. Then, the hypervisor responds with system resource usage data for the relevant hardware components in step 66. Based on a determination whether the system resource usage is less than a predetermined level, the BMC may indicate to the administrator, in step 67, whether or not it is an appropriate time to apply the firmware update and perhaps whether any such firmware update should be performed in-band (TB) or out-of-band (OOB). It should be recognized that the request for system resource usage may be limited to one or more hardware component for which a firmware update is available, or the request for system resource usage may be directed to the entire server.

While not specifically shown in FIG. 3, the administrator may model system resource usage over a period of time in order to anticipate when system resource usage is likely to be low. Depending upon the system resource usage pattern, usage may be low at a particular time of day, time of the week, week or weekend of the year, etc. and may wait for one of these time periods to request a firmware update.

Figure 4:
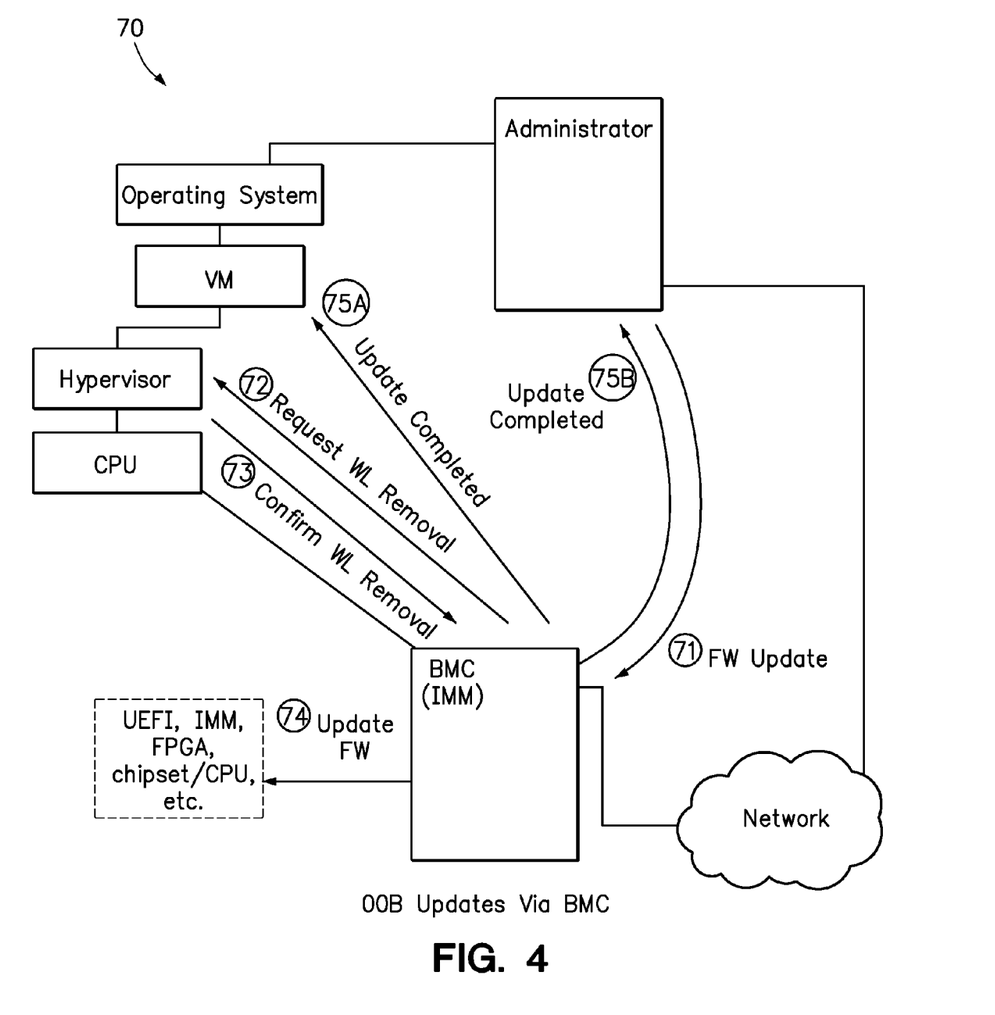
FIG. 4 is a schematic diagram of an out-of-band (OOB) process of updating firmware via the baseboard management controller (BMC).

FIG. 4 is a schematic diagram of an out-of-band (OOB) process 70 of updating firmware via the baseboard management controller (BMC). In step 71, the administrator sends the firmware update for one or more hardware components to the BMC. In step 72, the BMC requests that the hypervisor remove workload (WL) from the relevant hardware component(s). In step 73, the hypervisor confirms that the workload has been removed, or otherwise indicates that no workload will be allowed on the relevant hardware component(s). For example the hypervisor layer may consolidate the current workload of the server onto one or more other servers in the scaled complex or, if the current firmware update only applies to 1 or 2 hardware components within the server, then the hypervisor may selectively bring down those hardware components and move workload, if any, to a redundant resource within the scaled complex to allow for selective reset of that hardware component without requiring the entire chassis or entire scaled complex to be reset. In step 74, the BMC applies the firmware update to the one or more hardware component(s), such as the UEFI, BMC/IMM, FPGA, or the chipset/CPU. Thereafter, the BMC notifies the hypervisor, in step 75A, that the update has been completed such that the hypervisor may put the hardware component(s) back into service. Similarly, step 75B notifies the administrator that the firmware update has been completed. Both the VPD of the BMC and any similar table maintained by the administrator may be revised to reflect that the relevant hardware components are now running on the new firmware version.

Figure 5:
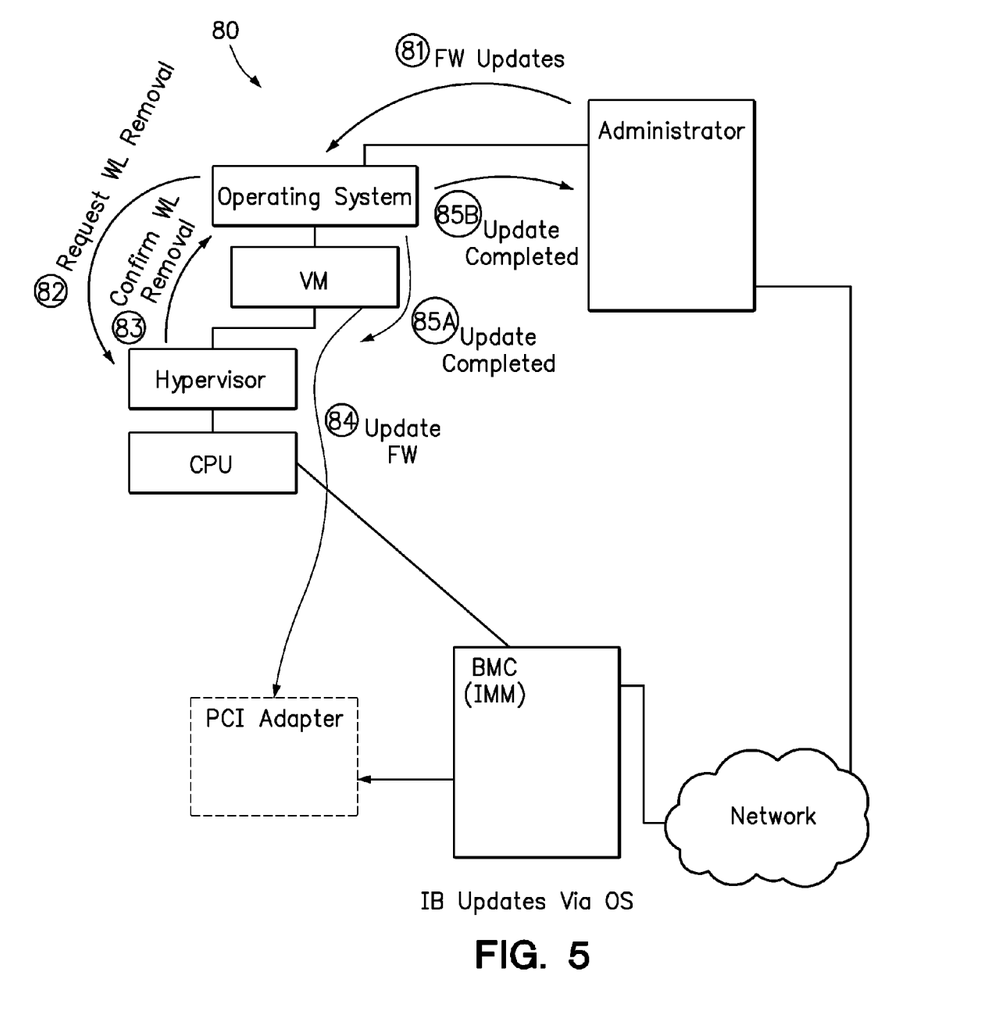
FIG. 5 is a schematic diagram of an in-band (IB) process of updating firmware via the operating system (OS).

FIG. 5 is a schematic diagram of an in-band (IB) process 80 of updating firmware via the operating system (OS). In step 81, the administrator sends the firmware updates to the operating system. In step 82, the operating system requests that the hypervisor remove workload from the relevant hardware components. In step 83, the hypervisor confirms that the workload has been moved or otherwise indicates that the relevant hardware components are ready for receiving a firmware update. In step 84, the operating system, and/or an update tool received from the administrator, applies the firmware updates to the relevant hardware components, such as a PCI adapter. Then, steps 85A and 85B notify the hypervisor and the administrator, respectively, that the firmware updates have been completed.

Figure 6:
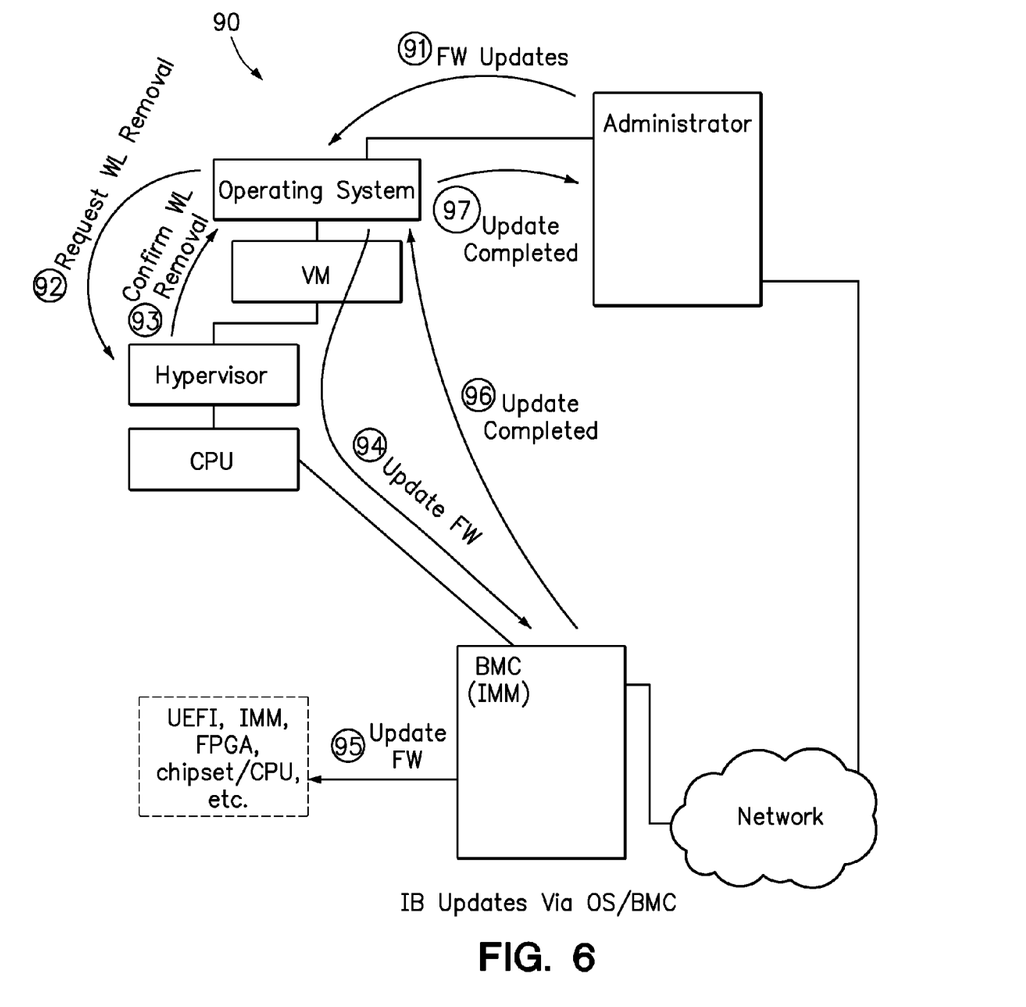
FIG. 6 is a schematic diagram of an in-band (IB) process of updating firmware via the operating system (OS) and the baseboard management controller (BMC).

FIG. 6 is a schematic diagram of an in-band (IB) process 90 of updating firmware via the operating system (OS) and the baseboard management controller (BMC). In step 91, the administrator sends the firmware updates to the operating system. In step 92, the operating system requests that the hypervisor remove workload from the relevant hardware components. In step 93, the hypervisor confirms that the workload has been moved or otherwise indicates that the relevant hardware components are ready for receiving a firmware update. In step 94, the operating system, and/or an update tool received from the administrator, forwards the firmware updates or at least a portion of the firmware updates to the BMC. In step 95, the BMC applies the firmware updates to the relevant hardware components, such as the UEFI, BMC/IMM, FPGA, or the chipset/CPU. In step 96, the BMC reports to the operating system that the firmware updates have been completed, and, in step 97, the operating system reports to the administrator that the updates have been completed.

Figure 7:
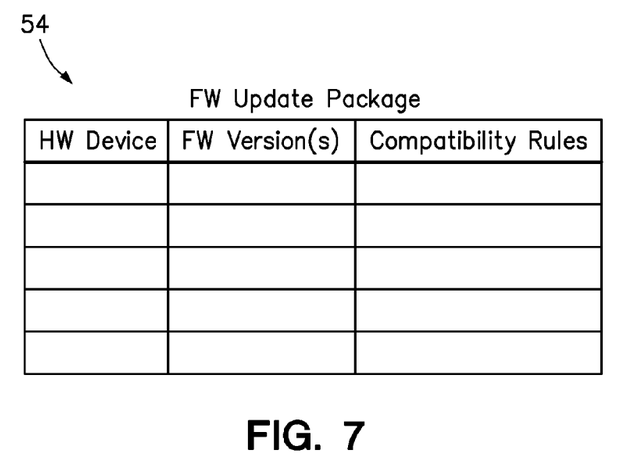
FIG. 7 is a table representing a firmware update package.

FIG. 7 is a table 54 representing a firmware update package. Each row of the table identifies a hardware device, the firmware version(s) provided in the firmware update package, and may optionally include compatibility rules.

Figure 8:
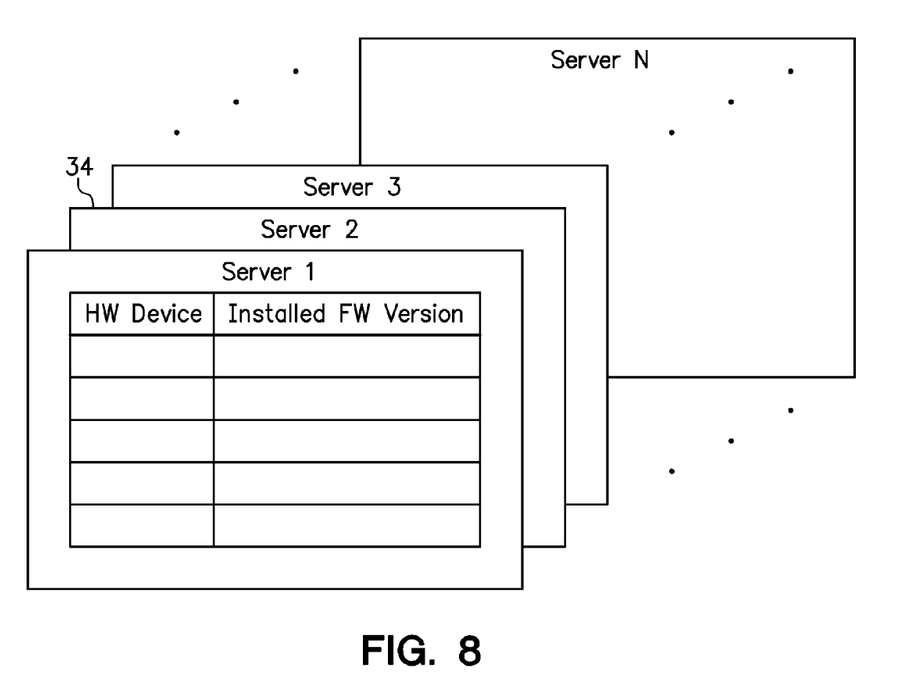
FIG. 8 is a set of tables representing vital product data (VPD) for each server or compute node, including an identification of the installed firmware version for each hardware device that uses firmware.

FIG. 8 is a set of tables representing vital product data (VPD) 34 for each server or compute node in the system. Each table identifies each hardware device or component on the particular server that uses firmware and the firmware version that is installed on that hardware component. Together, the table of FIG. 7 and the tables of FIG. 8 provide sufficient data so that the administrator can determine which hardware devices need one of the firmware updates in the firmware update package.

Figure 9A:
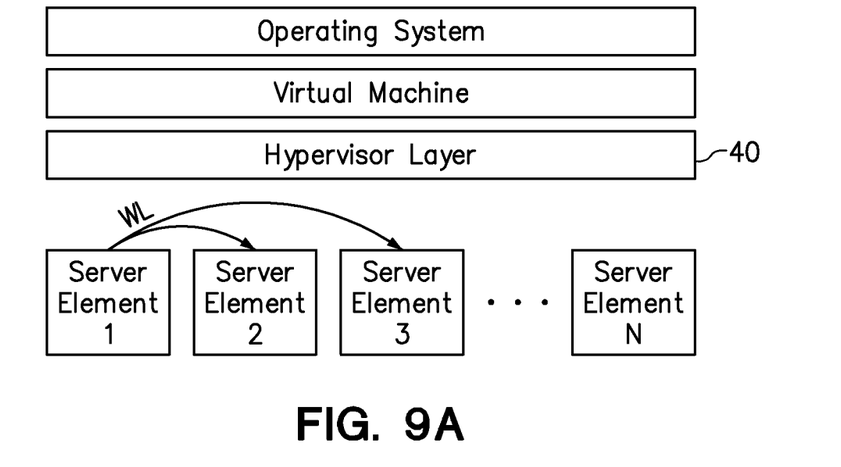
FIGS. 9A-D are schematic diagrams illustrating a process of removing workload from a server element (FIG. 9A), taking the server element offline (FIG. 9B), updating the firmware on the server element (FIG. 9C), and bringing the server element back online to handle a workload (FIG. 9D).
Figure 9B:
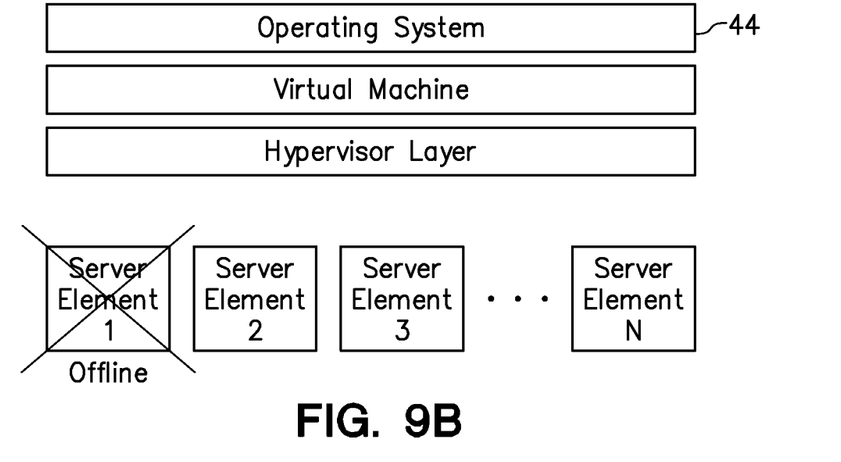
Figure 9C:
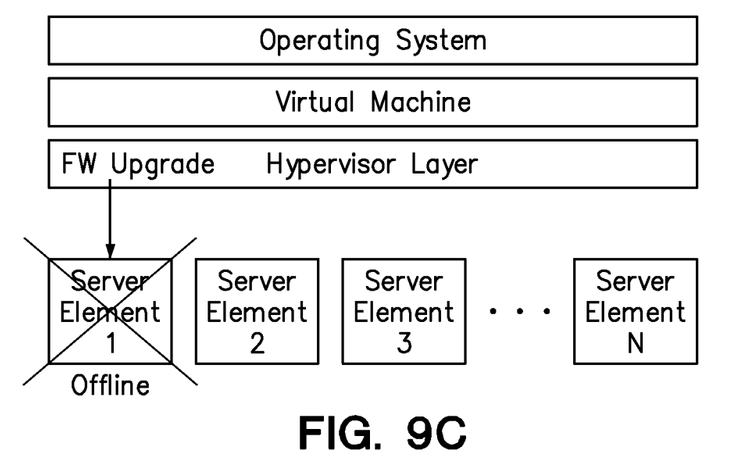
Figure 9D:
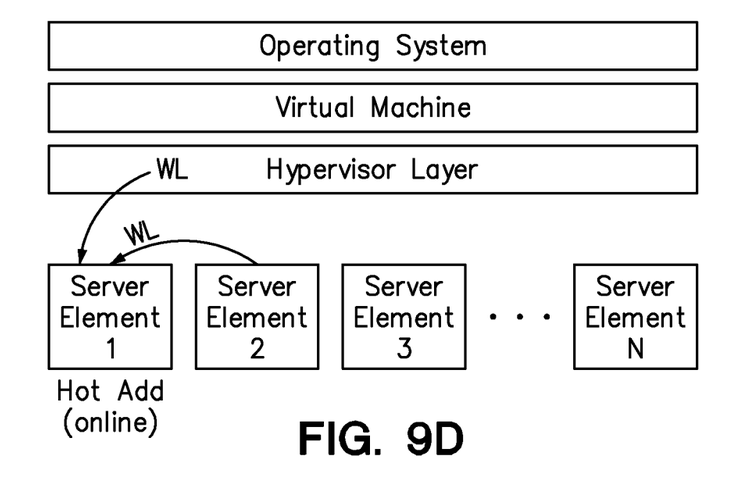

FIGS. 9A-D are schematic diagrams illustrating a process of removing workload from a server element (FIG. 9A), taking the server element offline (FIG. 9B), updating the firmware on the server element (FIG. 9C), and bringing the server element back online to handle a workload (FIG. 9D).

Regarding FIG. 9A, the hypervisor layer 40 is responsible for migrating workload from the Server Element 1 to one or more other Server Element in order to facilitate applying a firmware update to Server Element 1. Generally speaking, the server element may be, without limitation, a bootable node (server), one or more processor within a multiple-processor complex, a PCI express adapter, a data storage device, a specialty DIMM, or a power supply.

FIG. 9B illustrates that, after workload has been removed from Server Element 1, the Server Element 1 may be taken offline. Note that all, many, or at least some of the other Server Elements are still online and can be used to continue servicing a workload, such as an application running on the operating system 44. However, since Server Element 1 is offline, the capacity of the entire system of server elements is reduced, such that the method preferably only takes Server Element 1 offline during time periods when the system resource usage is less than some predetermined level.

FIG. 9C illustrates a firmware update or update being applied to the Server Element 1 while it is offline. This firmware update may be applied to any one or more sub-components of the Server Element 1, if any.

FIG. 9D illustrates that after the firmware update has been completed, the Server Element 1 is hot added or otherwise brought back online such that the hypervisor may again assign workload to the Server Element 1. This may be new workload or workload migrated from the other Server Elements. It should be recognized that the steps illustrated in FIGS. 9A to 9D may then be repeated with respect to another of the Server Elements in order to update the firmware in that Server Element. Any number of repetitions may be performed in order to implement a method of sequentially removing workload and updating the firmware across a portion or the entirety of the scaled complex. By sequentially updating only subsets of the scaled complex, but never the entire complex at once, a firmware update may be applied to the entire complex without ever having the entire complex offline or without a workload experiencing downtime or significant loss of performance.

Figure 10:
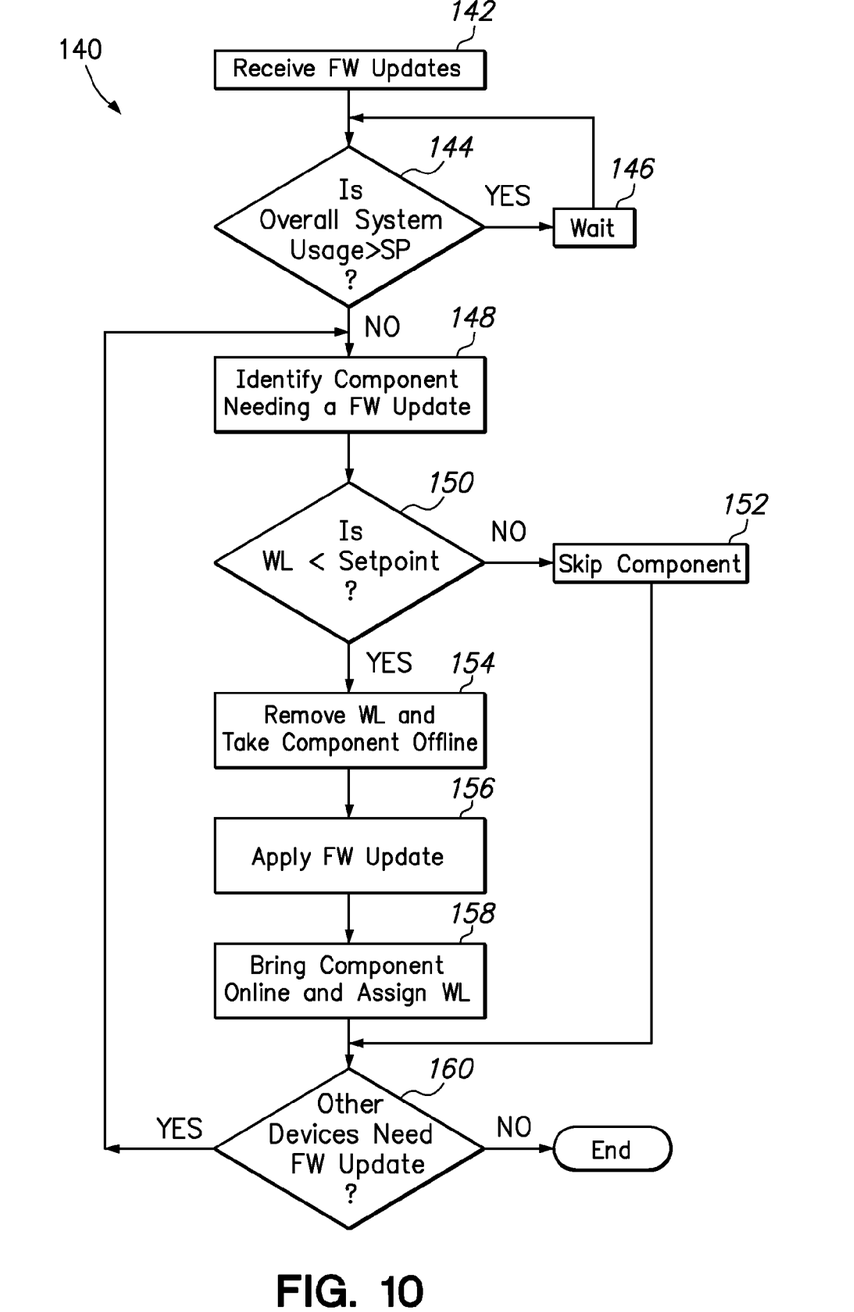
FIG. 10 is a flowchart of a method of sequentially updating firmware on a plurality of server elements.

FIG. 10 is a flowchart of a method 140 of sequentially updating firmware on a plurality of server elements. After receiving firmware updates in step 142, step 144 determines whether the overall system usage is greater than a predetermined setpoint. If so, then step 146 waits before returning to the determination of step 144. If the overall system usage is not greater than a predetermined setpoint, then step 148 identifies a hardware component needing a firmware update (i.e., a firmware update is available for that hardware component). If step 150 determined that the workload of a selected hardware component is not less than a predetermined setpoint, then the component is skipped per step 152. However, if the selected hardware component has a workload that is less than the predetermined setpoint, then the workload is removed and the hardware component is taken offline in step 154, the firmware update is applied to the hardware component in step 156, and the selected hardware component is brought back online and assigned workload in step 158. After either of steps 152 or 158, step 160 determined whether there are other hardware devices that need a firmware update. If so, then the method returns to step 148 to identify the next hardware component to be updated. If no other hardware devices need to be updated, then the method ends.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    running a scale-up hypervisor on a server complex including at least one server;
    running a single operating system and at least one application on top of the scale-up hypervisor;
    identifying a firmware update available for a first hardware component within the server complex;
    the scale-up hypervisor removing all workload from the first hardware component; and
    applying the identified firmware update to the first hardware component while the first hardware component is idle and the hypervisor continues running the single operating system and the at least one application.

2. The method of claim 1, wherein the scale-up hypervisor removing all workload from the first hardware component includes the scale-up hypervisor migrating all workload from the first hardware component to at least one other hardware component within the server complex, wherein the first hardware component and the at least one other hardware component are the same type of component.

3. The method of claim 1, wherein the scale-up hypervisor removing all workload from the first hardware component includes the scale-up hypervisor allowing the first hardware component to complete a current workload without assigning any additional workload to the first hardware component.

4. The method of claim 1, wherein the identified firmware update is applied to the first hardware component without the application experiencing any downtime.

5. The method of claim 1, wherein the first hardware component is a processor in a server having multiple processors.

6. The method of claim 1, further comprising:
the scale-up hypervisor assigning workload to the first hardware component after the identified firmware update to the first hardware component has been completed.

7. The method of claim 6, further comprising:
identifying a firmware update available for a second hardware component within the server complex;
the scale-up hypervisor removing workload from the second hardware component; and
applying the identified firmware update to the second hardware component while the second hardware component is idle and the hypervisor continues running the single operating system and the at least one application.

8. The method of claim 1, further comprising:
the operating system applying a firmware update to the first hardware component of the first server.

9. The method of claim 8, further comprising:
a platform management module on the first server applying a firmware update to a second hardware component of the first server.

10. The method of claim 1, further comprising:
an administrator comparing the firmware version of firmware installed on a hardware component with the firmware version of a firmware update available for the hardware component to determine whether to update the firmware of the hardware component.

11. The method of claim 1, wherein the server complex includes a plurality of servers.

12. The method of claim 11, further comprising:
the scale-up hypervisor removing all workload from a first server within the server complex to one or more other server within the server complex other than the first server;
taking the first server offline after all of the workload has been removed from the first server; and
bringing the first server back online and assigning workload to the first server after the identified firmware update has been completed.

13. The method of claim 11, wherein a firmware update can be applied to any hardware component in the plurality of servers.

14. The method of claim 13, further comprising:
sequentially applying firmware updates to a plurality of hardware components across the plurality of servers of the server complex.

15. The method of claim 1, further comprising:
the scale-up hypervisor passing system resource usage data for the at least one server to a platform management module on the at least one server.

16. The method of claim 15, further comprising:
initiating the firmware update in response to system resource usage being less than a predetermined amount of system resource usage.

17. The method of claim 15, further comprising:
modeling system resource usage as a function of time of day, day of the week, or day of the year.

18. The method of claim 17, wherein the system resource usage is modeled by an administrator module that is not part of the server complex.

19. The method of claim 17, further comprising:
requesting the platform management module to report current system resource usage at a time that the modeling expects system resource usage that is less than a predetermined amount of system resource usage; and
initiating the firmware update if the platform management module indicates that the current system resource usage is less than the predetermined amount of system resource usage.

20. The method of claim 19, further comprising:
the platform management module requesting the scale-up hypervisor to provide system resource usage for one or more hardware components identified by the administrator module as having a firmware update available.

* * * * *